US 7,748,033 B2

(12) United States Patent
Nita et al.

(10) Patent No.: US 7,748,033 B2
(45) Date of Patent: Jun. 29, 2010

(54) WINDOWS REMOTE DEBUGGER SERVICE (75) Inventors: Marius D Nita, Bellevue, WA (US);
Scott M Johnson, Redmond, WA (US);
Scott T Herrboldt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1452 days.

(21) Appl. No.: 11/066,524

(22) Filed: Feb. 25, 2005

(65) Prior Publication Data
US 2006/0195894 A1    Aug. 31, 2006

(51) Int. Cl.
G06F 9/00      (2006.01)
G06F 15/16     (2006.01)
G06F 9/44      (2006.01)

(52) U.S. Cl. .................. 726/11; 717/101; 717/124; 714/25

(58) Field of Classification Search .................. 726/11; 717/101, 124; 714/25
See application file for complete search history.

(56) References Cited

U.S. PATENT DOCUMENTS

| | | | | |
|---|---|---|---|---|
| 5,907,705 | A | * | 5/1999 | Carter ........................ 717/122 |
| 6,058,393 | A | * | 5/2000 | Meier et al. .................... 707/10 |
| 6,145,096 | A | | 11/2000 | Bereiter et al. |
| 6,324,683 | B1 | * | 11/2001 | Fuh et al. .................... 717/124 |
| 6,466,654 | B1 | * | 10/2002 | Cooper et al. ............. 379/88.01 |
| 6,654,699 | B2 | * | 11/2003 | Millard ........................ 702/108 |
| 7,062,556 | B1 | * | 6/2006 | Chen et al. ................... 709/226 |
| 2003/0101255 | A1 | * | 5/2003 | Green ........................ 709/223 |
| 2003/0212750 | A1 | * | 11/2003 | Butt ............................ 709/208 |
| 2004/0123271 | A1 | * | 6/2004 | Bindewald et al. .......... 717/124 |
| 2005/0193107 | A1 | * | 9/2005 | Sekiguchi et al. ........... 709/223 |

FOREIGN PATENT DOCUMENTS

EP    1408410 A1    4/2004
EP    1505769 A2    2/2005

OTHER PUBLICATIONS

Cunha et al., "An Experiment in Tool Integration: the DDBG Parallel and Distributed Debugger", 1997, Elsevier, pp. 1-15.*
European Search Report for European Patent Application No. 06100515.3, dated Feb. 25, 2010 (7 pages).

* cited by examiner

Primary Examiner—Kambiz Zand
Assistant Examiner—William S Powers
(74) Attorney, Agent, or Firm—Wolf, Greenfield & Sacks, P.C.

(57) ABSTRACT

Systems and methodologies for a scalable remote debugging system that can debug machines positioned behind a firewall and thru the Internet, via employing an Internet Friendly Relay Service (IFRS). The IFRS can be positioned in a common reach location and provide a secure method of exchanging communication traffic over HTTP using SSL and security tokens in real time. Web server(s) of the IFRS can further employ an authorization and/or tracking system to verify connection of a client thereto, for debugging purposes.

20 Claims, 9 Drawing Sheets

WINDOWS REMOTE DEBUGGER SERVICE

TECHNICAL FIELD

The subject invention generally relates to data exchange between machines with a firewall(s) positioned there between, and more particularly to a scalable remote debugging service that employs an intercept to connect machines via a seamless connection over Hyper Text Transfer Protocol (HTTP).

BACKGROUND OF THE INVENTION

Increasing advances in computer technology (e.g., microprocessor speed, memory capacity, data transfer bandwidth, software functionality, and the like) have generally contributed to enhanced computer application in various industries. Ever more powerful server systems, which are often configured as an array of servers, are commonly provided to service requests originating from external sources such as the World Wide Web, for example.

The process of eliminating errors from various computer software/applications is commonly known as debugging. For example, during the coding of computer programs, the inadvertent production of errors or bugs, is typically unavoidable—when a line of code or an instruction conflicts with other elements of the code, for example. To mitigate the adverse effects of such occurrences, debugging systems are developed to help identify and eliminate bugs from a computer program. In addition, a variety of debugging tools and methods exist that perform diagnostics for analyzing various types of problems with server applications. Such debugging can be quite costly and time consuming, depending on the complexities involved such as: type of server, existence of firewalls, and the like.

Also, debugging has typically been performed by employing a plurality of different approaches such as: computer software debugging, hardware description language functional verification, hardware logic level analysis, or hardware behavioral source level emulation, and the like. For example, computer software debugging can be implemented by employing a computer software debugger.

In general, a computer software debugger is a software tool that allows a software developer to control the execution of a running computer software program by: setting breakpoints; sequentially single-stepping through the execution of the computer software program; looking at the program's state by examining and displaying variables and expressions, and the like. Moreover, such software tools (e.g., debuggers), can be developed for reducing debugging cycle time. Debuggers typically execute as self-contained processes for controlling an application program under study through operating system primitives designed for that purpose. Also, software debuggers can usually offer interactive debugging of software programs that are sequentially executed on computers. Nonetheless, such debugging tools are not readily scalable to different server and computer configurations and architectures.

At the same time, presence of corporate firewall(s) can further add to the complexities of debugging machines positioned behind such firewall(s). Typically, a firewall can be considered a first line of defense in protecting private information, and can be implemented in both hardware and software, or a combination of both. Such firewalls can typically hinder easy access of a Developer to a Tester for debugging purposes. For a proper debugging session to properly run in such environment, typically cumbersome planning and meticulous execution can be required. Moreover, significant challenges exist if several debugging sessions on different machines are desired.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for a scalable remote debugging system that can debug machines positioned behind a firewall and thru the Internet, via employing an Internet Friendly Relay Service (IFRS) that functions as an intercept to provide a secure method of exchanging communication traffic over Hyper Text Transfer Protocol (HTTP). As such, whenever breaking through a firewall is desired to access an exchange server—the subject invention can mitigate a requirement for opening Transmission Control Protocol (TCP) ports in such environments. As such, a client (e.g., an end user, a Tester or Developer) located on one side of the firewall can continuously poll the main server associated with the IFRS for commands and answers. By holding the answer—the client on the other side of the firewall can approach such server and capture the answer to the command, and thus provide for a seamless connection over HTTP traffic, using Secure Sockets Layer (SSL) and security tokens in real time. In a related aspect, a load threshold can also be provided by the IFRS, to determine whether to commence, pause, resume and/or halt data transfer on any machine and/or client that polls the IFRS services. Such load threshold can balance the processing across multiple machines, to further mitigate burdening any one machine. Also, various artificial intelligence schemes can be employed to facilitate regulation and/or balance of the load between the IFRS and the clients. In addition, during a debugging session between a Developer machine(s) and a Tester machine(s), another Developer(s) machine can join the existing debugging session, and retrieve cached debugging history, to observe and/or engage in such debugging session.

It is to be appreciated that although the invention is primarily described in the context of debugging procedures, various aspects of the subject invention can also be employed during exchange of binary data between a client and a server, wherein a firewall(s) is located there between. For example, the subject invention can also be employed for exchange of binary data with a server at one end of the firewall and a client(s) on the other end of the firewall, wherein typically binary data cannot be pushed to the client(s) because of the firewall arrangement. As such, the subject invention can facilitate such communication by placing an intercept that can relay traffic (Internet Friendly Relay Service—IFRS) over the internet. Thus, client A and client B, which are positioned behind firewalls, can talk to a web server associated with the IFRS that is located in a common reach location, and the web server can employ an authorization and/or tracking system to verify connection of a client thereto.

Accordingly, if client A requires transmittal of binary data to client B, client B needs to ask the server for information, and hence a polling mechanism can be employed. As such, both clients A and B typically should poll the web server, due to restrictions of the firewall. When Client B receives an answer from client A (e.g., answer to a command, stream of data, binary exchange, and the like), client A will then poll the server to verify if there is data waiting to be transmitted.

In yet another aspect of the subject invention, a mathematical algorithm can be employed to specify the random behavior, and periodic intervals and/or the number of times each of the clients can poll the web server. Such an algorithm can facilitate formation of an adaptive poll on the web server, for example in terms of a Poisson distribution. Thus, the system can be scaled and the traffic between client A and client B regulated, so the web server is polled at long time intervals (e.g., more than 5 seconds.) In addition, the server can: notify a client upon change of behavior of the other client (e.g., clients learning to relax and learn how often to ask for information); maintain a statistical database for the activities of either clients, and predict the pattern of the events (e.g., streaming of binary exchange between clients) to regulate the load on such server. In particular, when HTTP overhead adds upon the TCP binary data, the subject invention can mitigate frequent polling sessions between the clients and such web server.

In a related aspect, an intelligent proxy entity(ies) can be provided that can aggregate requests from a plurality of clients to facilitate communication with the IFRS, and to further delineate the type and number of TCP connections required by each client. As such, optimizations can be performed for interaction with the web server of the IFRS. For example, the intelligent proxies can aggregate communications between clients to one major push to the web service, as opposed to each client contacting the web service independently. Similar intelligent proxies can be employed at the other side, where data is being supplied by the web server to readily create the TCP channels between the various clients, and/or machines that require debug procedures. It is to be appreciated that the IFRS and the intelligent proxy entity(ies) can also detect absence of the firewall(s) (or available open ports through such firewalls), and further communicate (e.g., via TCP) based on an event based mechanism.

According to a further aspect of the subject invention, a Tester with a machine that has failed on one side of a firewall, and connected via a USB to a debugger with bug checker crash, can poll the web server of the IFRS. In such environment, the intelligent proxy entity can take the Transmission Control Protocol/Internet Protocol (TCP/IP) traffic from a debugger tool, and instead of forwarding it through the network, it can package it up in the form of HTTP and out of the firewall, and up to the web server of the IFRS. The IFRS can then cache the information and place such information in the buffer as part of the IFRS data base. Such cached data can then be prepared for eventual transport to the Developer. Next, the machine can be registered and ready to be debugged, wherein the Developer can receive notification (e.g., an e-mail) that specifies that the machine anticipates a debugging by the Developer.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Moreover, as used herein, the term "inference" refers generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention provides for a scalable remote debugging system that can debug machines positioned behind a firewall and thru the Internet, via employing an Internet Friendly Relay Service (IFRS). It is to be appreciated that although the invention is primarily described in the context of debugging procedures, various aspects of the subject invention can also be employed when exchange of binary data is required between a client and a server, with a firewall(s) located therebetween.

Figure 1:
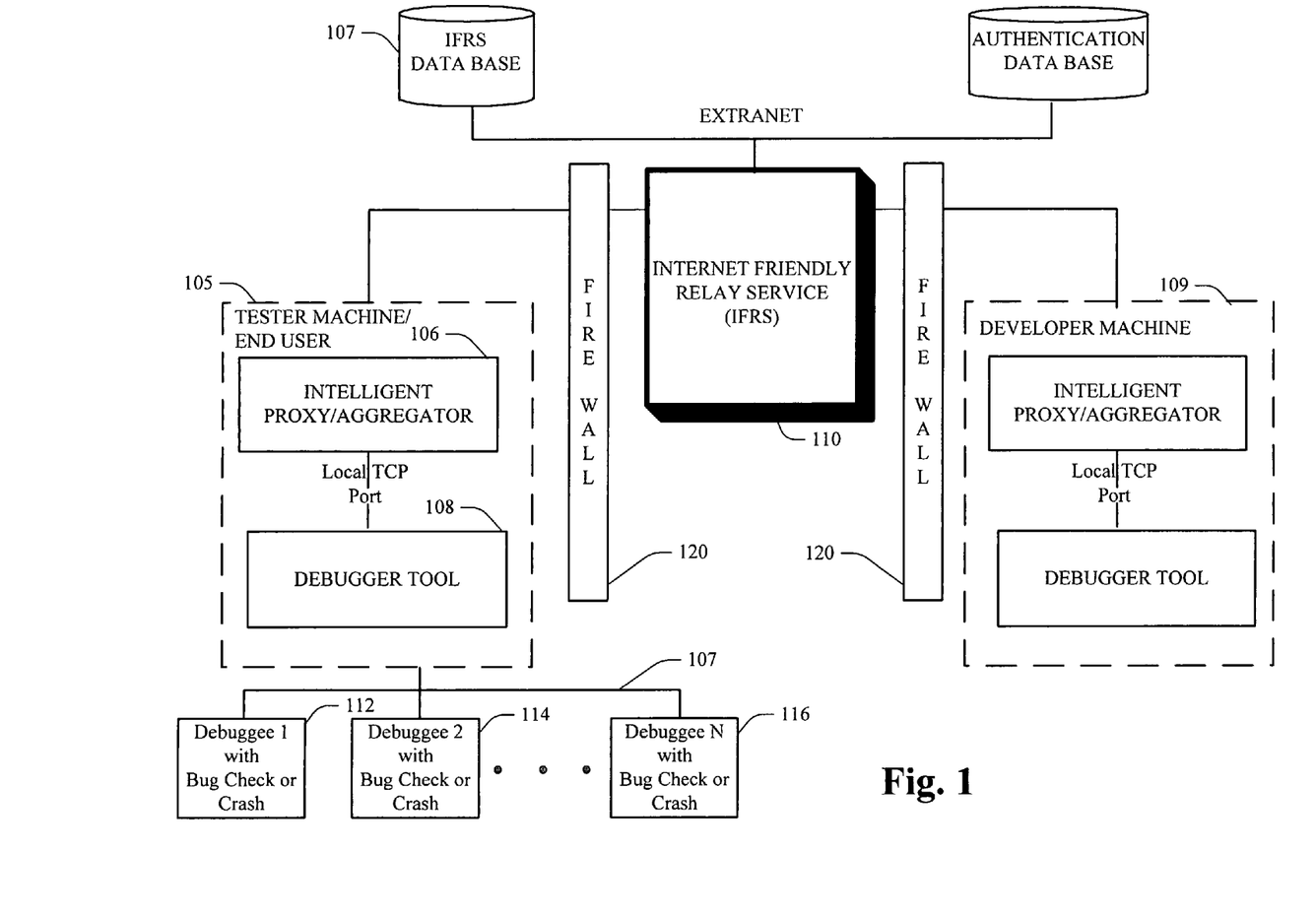
FIG. 1 illustrates a schematic block diagram of an Internet Friendly Relay Service (IFRS) in a Tester—Developer debugging application, in accordance with an aspect of the subject invention.

Referring initially to FIG. 1, there is illustrated an IFRS 110 in accordance with an aspect of the subject invention. The IFRS 110 can provide a secure method of exchanging communication traffic over HTTP using SSL and security tokens in real time.

Moreover, it can function as an intercept that can relay traffic relay over the internet, and can inform a client connected thereto to "load balance", and relax a poll session for example, as described in detail infra. The IFRS 110 can include an Internet Information Services (IIS) web server that can provide World Wide Web publishing services, File Transfer Protocol (FTP) services, Simple Mail Transport Protocol (SMTP) services, and Network News Transfer Protocol (NNTP) services and the like. The IIS can be accessed thru a web browser (e.g., Internet Explorer) via HTTP over the Internet. The web server, as part of the IFRS. can be located in a common reach location, wherein the web server can employ an authorization and/or tracking system to verify connection of a client thereto.

As illustrated, the firewall 120 typically provides a perimeter defense to commonly limit access to an internal network from an insecure external network. Such firewall 120 can also be employed to restrict traffic between segments of an internal network. Typically, an important asset for firewall 120 is its configuration files. Such files can determine what traffic to be allowed and what traffic to be blocked. If such information is revealed, then the firewall can become vulnerable.

Also, the firewall 120 can be any of a packet filter or proxy. As a packet filter, firewall 120 can employ routers grant or deny access based on source addresses, destination address and port. Such can function as a fast and flexible firewall 120.

The firewall 120 can further include proxies that function as mediators or relays for traffic passing thru them. For example, two types of proxies; namely circuit level proxies and application level proxies can be employed as part of the firewall 120. Circuit level proxies have great similarities with packet filters, as they both can make a decisions based on almost the same low level information, and they are both general devices. Basically, a difference between a packet filter and a circuit level proxy is that all traffic that the proxy mediates will seemingly originate and terminate in the proxy, while the traffic through a packet filter will keep its originating and terminating points. Likewise application level proxies are capable of making decisions based on the content of traffic mediated thereby, as they understand the application used. Such application level proxies can be high level devices that are capable of making decisions based on the content of the traffic mediated by them, as they understand the application protocol used. Accordingly, application level proxies employed in the firewall(s) 120 can typically be very specialized, and separate proxies are needed for different application protocols, e.g., one for FTP, one for HTTP, and the like.

As illustrated in FIG. 1 the Tester 105 (or and end user) is connected to a debuggee machine that has failed and that needs to be debugged via a serial or 1394 cable, wherein any of the debuggees 112, 114, 116 (where N is an integer) can form the system under test. A debugging session can be initiated, wherein the IFRS 110 can be polled at periodic intervals by the Tester 105 and the Developer 109. As such, due to restrictions of the firewalls 120 both the Tester 105 and the debugger machine 109 typically query the web server associated with the IFRS 110 thru a polling arrangement.

Similarly, in case of two clients communicating on either side of a firewall, a client located on one side of the firewall can continuously poll the web server for commands and answers. By holding the answer—the client on the other side of the firewall can approach the web server and capture the answer to the command, and thus provide for a seamless connection over HTTP traffic. In addition, the IFRS 110 can act as a manger for balancing the load and the latency in which the web server is being polled by the Tester 105 and/or the Developer 109. In general, the IFRS 110 can supply information via one or more data transfer protocols, including known network protocols and/or proprietary protocols. Examples of suitable network protocols include: Hyper Text Transfer Protocol (HTTP), and Simple Object Access Protocol (SOAP).

As illustrated in FIG. 1, the intelligent proxy/aggregator 106 can take the Transmission Control Protocol/Internet Protocol (TCP/IP) traffic from the debugger tool 108, and instead of forwarding such traffic through the network, it can package the traffic up in the form of HTTP and out of the firewall 120, and up to the IFRS 110. The IFRS 110 can then cache the information, and place such information in a buffer as part of the IFRS data base 107. Such cached data can then be prepared for eventual transport to the Developer 109. The Developer 109 can then receive a notification (e.g., an e-mail) that a particular machine is ready to be debugged, and thus is registered for a debugging check. There can also exist a predetermined business arrangement as to the purpose of notifying the Developer 109. The Tester 105 can also announce itself to the IFRS 110, so that it can be observed by the Developer 109.

Upon receipt of such notification, the Developer 109 can then connect or poll on to the IFRS 110 to obtain the first packet of information to initiate a conversation. Such initiation of the server poll can additionally include providing information regarding at least one of: the client, a data retrieving condition(s), a time-out, the storage medium, a subscriber, and a storage location for retrieved information. Such polling of information can also include requesting information as a stream, a file, a data packet and/or a data burst.

Figure 2:
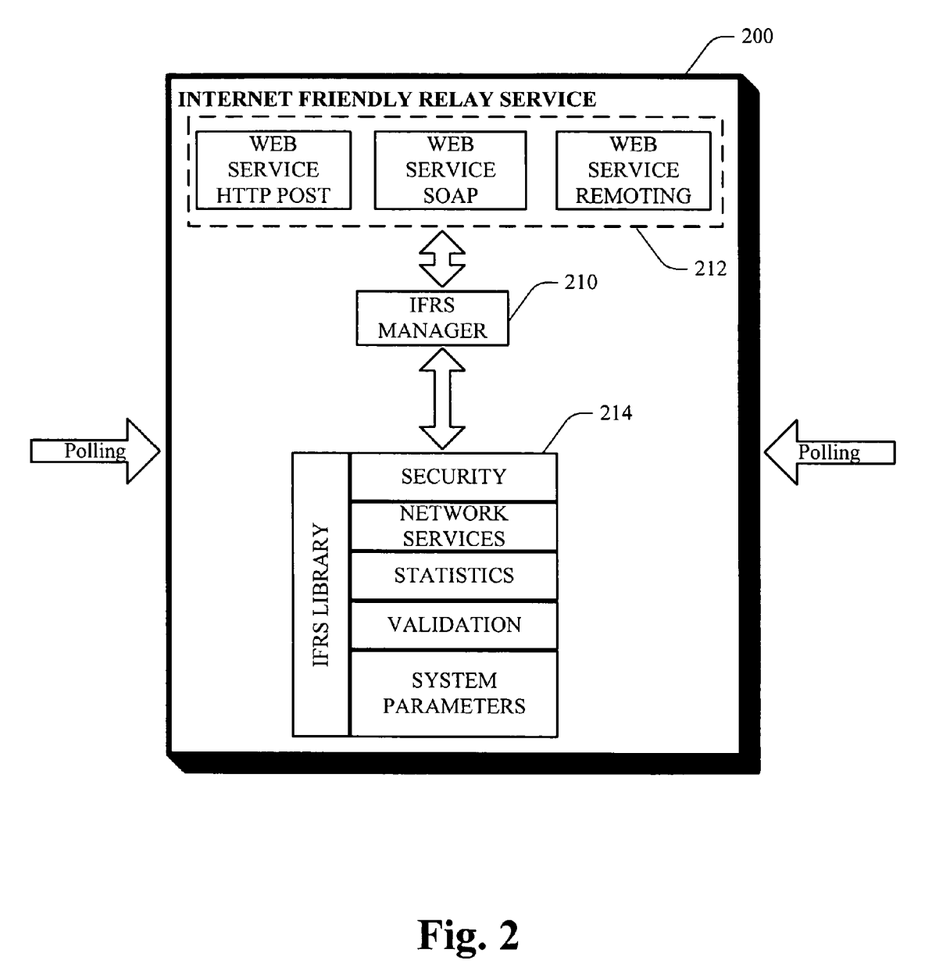
FIG. 2 illustrates an exemplary architecture for the IFRS according to a particular aspect of the subject invention.

FIG. 2 illustrates a block diagram of an IFRS 200 system in accordance with an aspect of the subject invention. The system can include an IFRS manger 210 that can interact with an IFRS library 214, to track an authorization, security, validation and to verify connection of a client thereto. A load threshold can also be provided by the IFRS manager 210, to determine whether to commence, pause, resume and/or halt data transfer on any machine employing and/or polling the IFRS 200, for example, to balance processing across multiple machines, which can then mitigate burdening any one machine. Typically, when a message transfer session (e.g., a connection) is initiated, the IFRS manager 210 can generate a connection instance for the session. The connection instance can be populated with information indicative of the client, the machine and the message(s), and/or a connection ID (e.g., a keep-alive message), for example. Such information can be utilized to begin message transfer between the IFRS and a client (e.g., a Tester or a Developer). Furthermore, the connection ID can be utilized to track message transmission within different machines.

The connection instance can additionally be dynamically updated to reflect transmission progress and provide transmission history. For example, indicia indicative of any portions—(including the entire message)—that have been transmitted successfully or failed can be associated with the connection instance. Transmission history can include information related to transfer commencement and completion, pauses and resumes, the level of communication activity (e.g., chattiness among the clients) errors, re-submissions, changes in the servicing machine, and the like.

For example, when the IFRS 200 is invoked to establish a connection between a Tester and a Developer, the IFRS manager 210 can track machine identity (e.g., a globally unique identity, or GUID), to generate a connection instance for such connection. The connection instance can include the identity for any of the machines to be debugged, via the system parameters as part of the IFRS library 214. Such information can be utilized to locate the desired machine and verify that the desired machine and adapter have been provided with access or been properly registered. If the invocation includes information indicative of the client and/or the message to pull, such information can additionally be included with the connection instance. This information can be utilized to locate and verify the client and message. In addition, the connection ID and required debugging parameters can be included and employed as a key to the connection instance, and also by the IFRS manager 210 to manage the transfer session. It is to be appreciated that more than one machine on the Developer side, or on the Tester side can request connection to the IFRS 200, as part of a plurality of distributed machines. For example, during a debugging session between a Developer machine(s) and a Tester machine(s), another Developer(s) machine can join the existing debugging session, and retrieve cached debugging history, to observe and/or engage in such debugging session.

Thus for a given message, one of several machines can be selected to initiate polling and/or begin message transmission. In addition, more than one machine can contribute to the transfer. For example, one machine can be utilized to begin message transmission and the connection can be subsequently floated to another machine(s) to continue and/or complete the transmission. Such aspects can be utilized to ensure reliability, mitigate transmission and machine errors and provide for efficient distribution of processing across machines. In general, the connection ID stored within the connection instance can be utilized to determine which machine can access the connection instance and pull data from the client. For example, the connection ID can be conveyed to a machine, which can then lock the connection instance and begin message conveyance, wherein only the machine that holds the connection ID can lock and facilitate message transmission. In order for another machine to contribute to message transmission, the connection ID, and hence the lock, can be floated to the other machine.

As such, the Developer and/or the Tester located on the other side of the firewall can poll the IFRS 212 and capture the answer to a command, to provide for a seamless connection over HTTP traffic, for example. Moreover, the Transmission Control Protocol/Internet Protocol (TCP/IP) traffic from a debugger tool can be packaged in the form of an HTTP and out of the firewall, to the web server 212 of the IFRS 200. The IFRS 200 can then cache the information and place such information in the buffer (not shown) as part of the IFRS data base. Such cached data can then be prepared for eventual transport to the Developer. The IFRS 200 can be polled at periodic intervals to determine whether it has any data to transmit the Developer or Tester.

Figure 3:
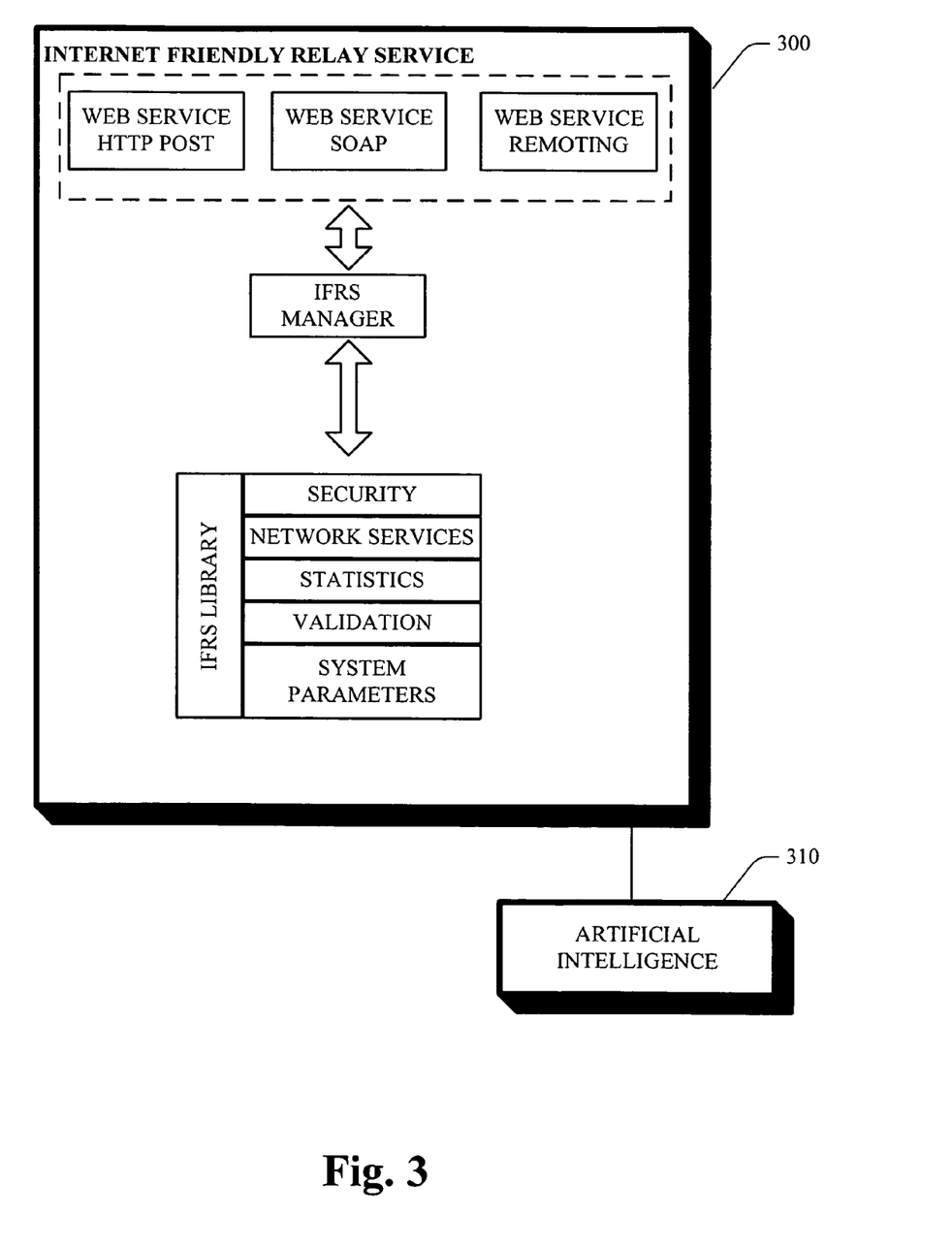
FIG. 3 illustrates another exemplary block diagram for an IFRS that employs an artificial intelligence component in accordance with an aspect of the invention.

FIG. 3 illustrates an IFRS in accordance with an aspect of the subject invention that employs an artificial intelligence component. As illustrated, the subject invention can employ various artificial intelligence based schemes for carrying out various aspects such as: in connection with regulating and/or balancing of the load and/or polling the IFRS 300. For example, a process for learning explicitly or implicitly when a client that polls the IFRS 300 can relax, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=$confidence(class). Moreover, various statistical based distributions (e.g., Poisson distribution) can be employed to evaluate or anticipate load levels among the IFRS 300, the Developer and the Tester, for example to specify the random behavior and how frequent each of the machines can poll the web server, and to form an adaptive poll.

Figure 4:
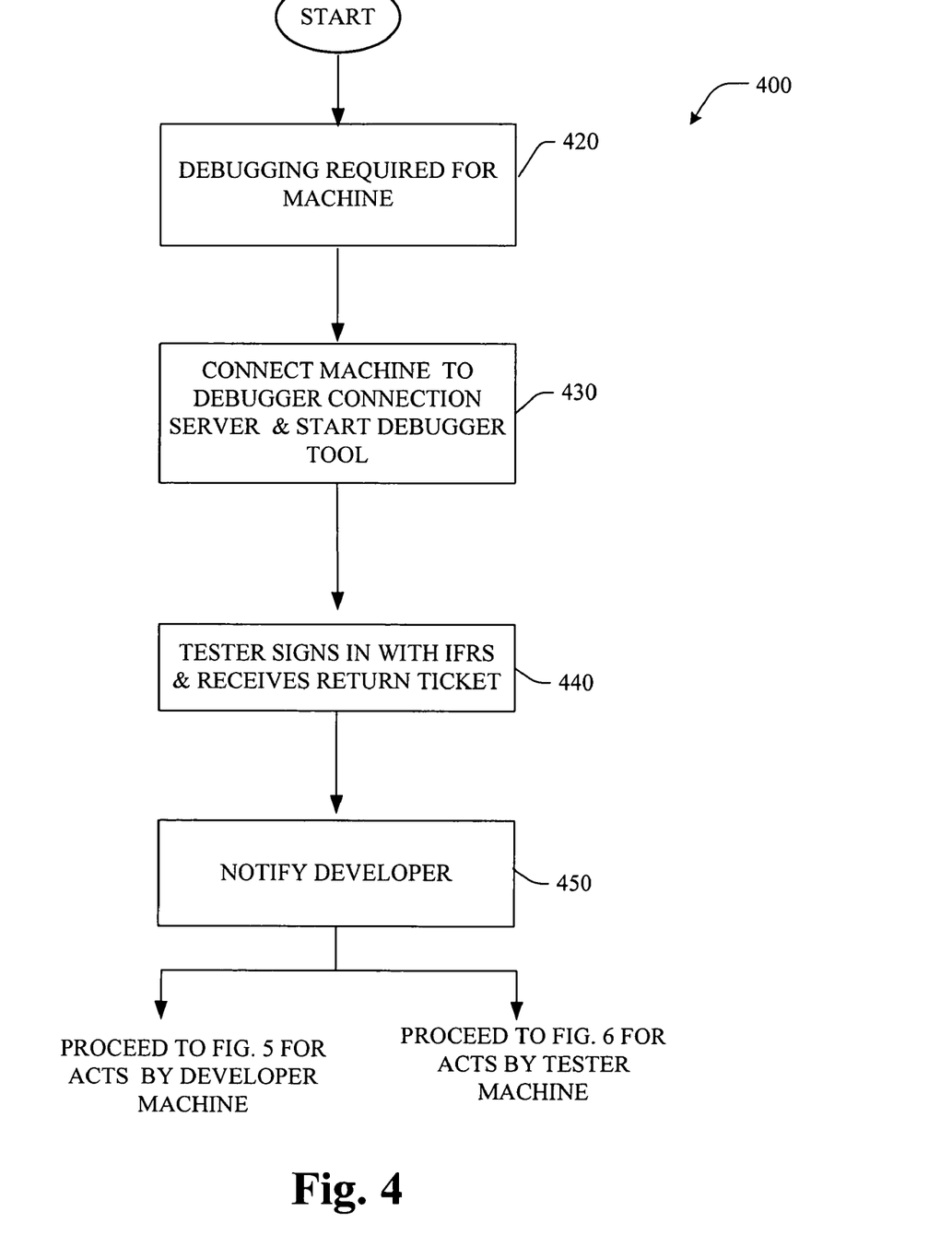
FIG. 4 illustrates a flow chart of a debugging procedure according to a methodology of the invention.

Referring now to FIG. 4 an exemplary methodology of debugging a machine in accordance with an aspect of the subject invention is illustrated, wherein the Developer and the Tester can be placed behind firewalls, and the IFRS located in a common reach location. Initially, and at 420 a debuggee machine that has failed, requires a debugging. Such a debuggee machine can then be connected via a serial or 1394 cable, to the Tester at 430. The Tester then signs in with the IFRS at 440, and receives a return ticket therefrom. Upon signing of the Tester with the IFRS a notification can be sent to the Developer (e.g., via an e-mail), at 450 or advertised to the IFRS. Next, for acts performed by the Developer the methodology proceeds to FIG. 5, and for acts performed by the Tester the methodology proceeds to FIG. 6.

Figure 5:
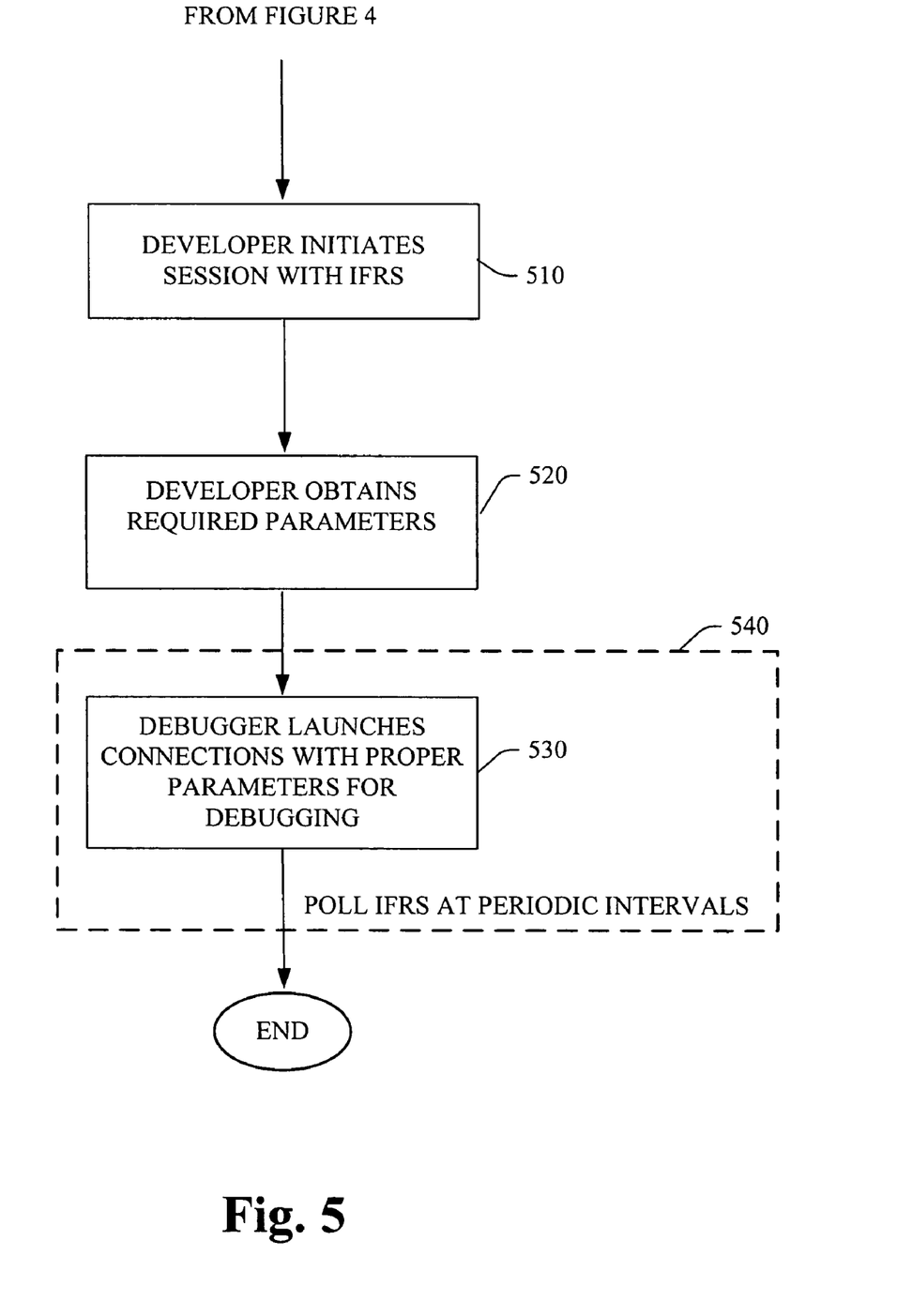
FIG. 5 illustrates another aspect for a debugging methodology in accordance with an aspect of the subject invention.

As illustrated in FIG. 5, upon notification being received, the Developer can then initiate a session with the IFRS at 510. Next, and 520 such Developer can obtain required parameters for debugging the debuggee. Based on such parameters, a debugger session can be launched for debugging procedure, at 530. As such, a polling mechanism 540 can be employed, wherein the IFRS can be polled periodically to verify if there is data waiting for transmittal to the Developer.

Figure 6:
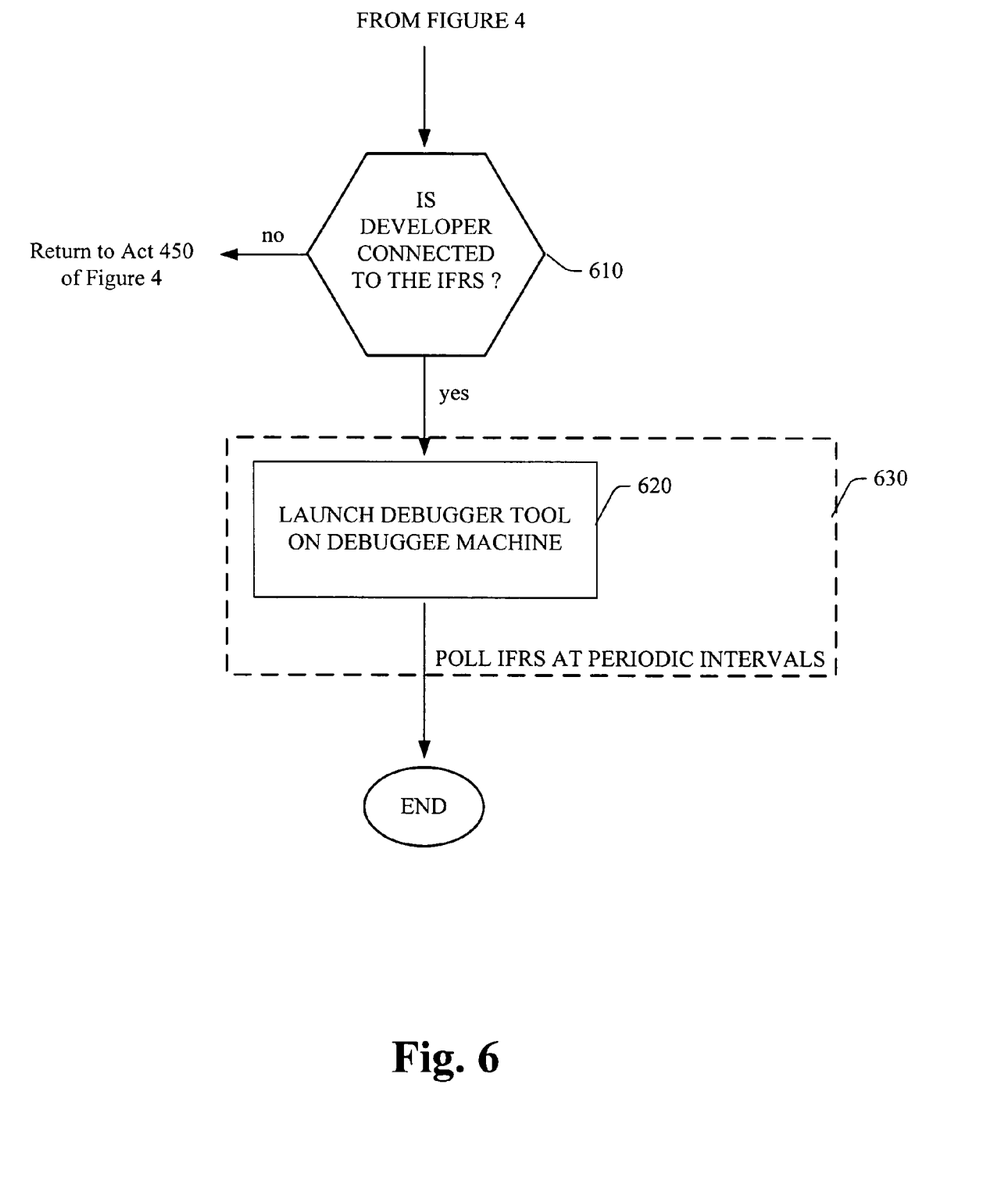
FIG. 6 illustrates a further flow chart for a methodology of debugging a machine that is positioned behind a firewall in accordance with an aspect of the subject invention.

Likewise, FIG. 6 illustrates a series of acts performed by the Tester in accordance with an aspect of the subject invention. At 610, a determination is made as to whether the Developer has connected to the IFRS. If not, the methodology returns to act 450 of FIG. 4. Alternatively, and If the Developer is connected to the IFRS, then the debugger tool is launched on the debuggee machine. A polling mechanism 630 can be employed, wherein the IFRS can be polled periodically to verify if there is data waiting to be transferred to the Tester.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 7:
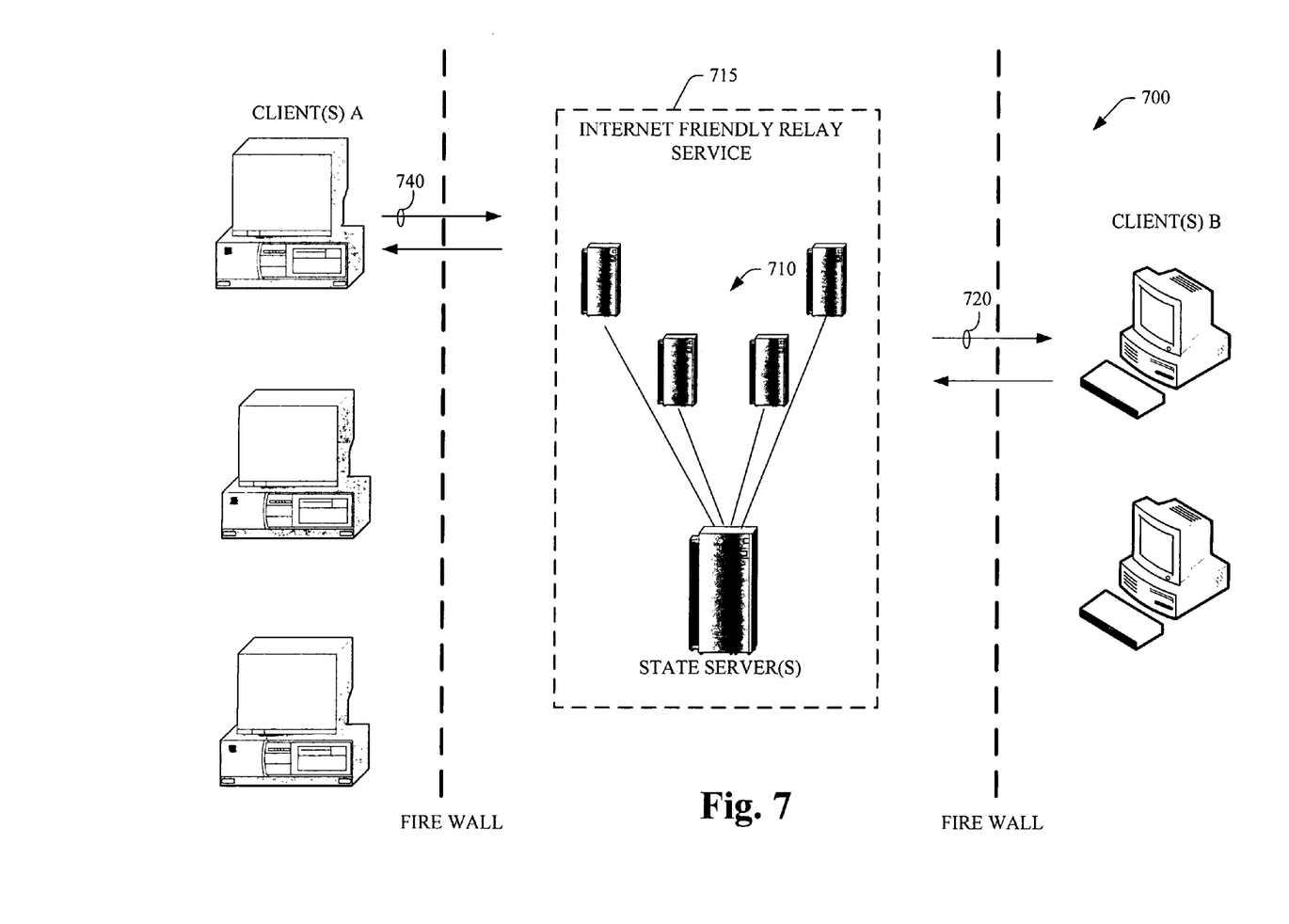
FIG. 7 illustrates a block diagram for a system that exchanges data between client(s) positioned on different sides of firewalls, wherein exchange of binary data can be facilitated via an IFRS in accordance with an aspect of the subject invention.

FIG. 7 illustrates a block architecture 700 for client(s) A and client(s) B positioned behind firewalls, for which exchange of binary data can be facilitated via an IFRS 715 in accordance with an aspect of the subject invention. If client(s) A requires transmittal of binary data to client B, client B needs to ask the server(s) 710 of the IFRS 715, for information, and hence a polling mechanism is typically employed. As such, both clients A and B typically have to poll the web server(s) 710, due to restrictions of the firewall.

When Client B receives an answer 720 from client A (e.g., answer to a command, stream of data, binary exchange, and the like), client A can then poll 740 the server(s) 710 to verify if there is data waiting. In a related aspect of the subject invention, a mathematical algorithm can be employed to specify the random behavior and how frequent each of the clients A and B can poll the web server 710, to form an adaptive poll on the web server 710, for example in terms of a Poisson Distribution. Thus the system 700 can be scaled and the traffic between client A and client B regulated, so the web server(s) 710 is polled at long time intervals (e.g., more than 5 seconds.) In addition, the server(s) 710 can notify a client upon change of behavior of the other client (e.g. clients learning to relax and to learn how often to ask for information), and further maintain a statistical database for the activities of either clients, and predict the pattern of the events (e.g., streaming of binary exchange between clients), to regulate the load on the server(s) 710. In particular, when HTTP overhead adds upon the TCP binary data, the subject invention can mitigate frequent polling sessions between the clients and the web server(s) 710.

Figure 8:
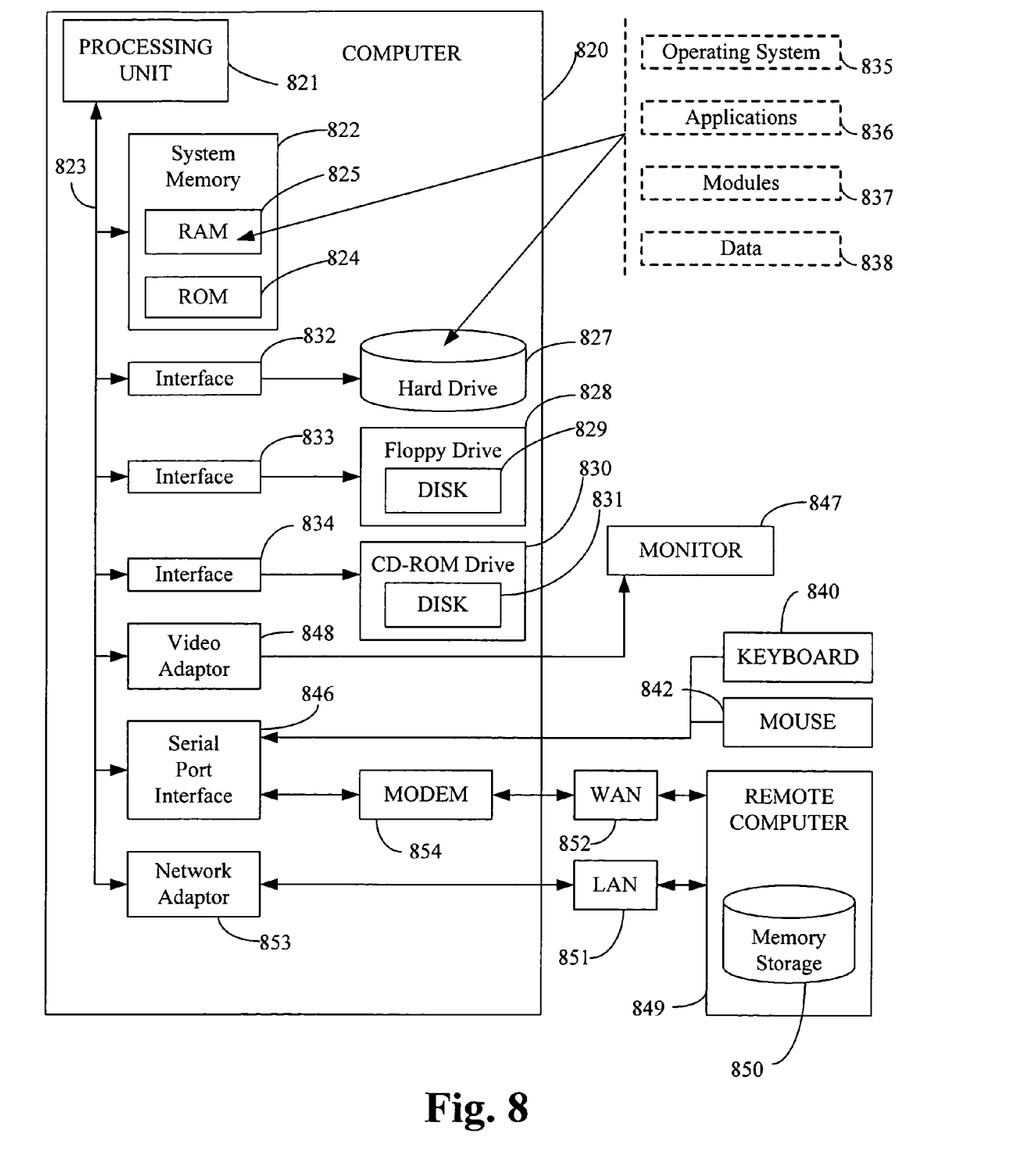
FIG. 8 illustrates a brief, general description of a suitable computing environment wherein the various aspects of the subject invention can be implemented.

Referring now to FIG. 8, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 820, including a processing unit 821, a system memory 822, and a system bus 823 that couples various system components including the system memory to the processing unit 821. The processing unit 821 can be any of various commercially available processors. Dual microprocessors and other multi-processor architectures also can be used as the processing unit 821.

The system bus can be any of several types of bus structure including a USB, 1394, a peripheral bus, and a local bus using any of a variety of commercially available bus architectures. The system memory may include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 827, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 825, including an operating system 835, one or more application programs 836, other program modules 837, and program data 838. The operating system 835 in the illustrated computer can be substantially any commercially available operating system.

A user can enter commands and information into the computer 820 through a keyboard 840 and a pointing device, such as a mouse 842. Other input devices (not shown) can include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 can operate in a networked environment using logical connections to one or more remote computers, such as a remote computer 847. The remote computer 847 may be a workstation, a server computer, a router, a peer device or other common network node, and typically includes many or all of the elements described relative to the computer 820, although only a memory storage device 850 is illustrated in FIG. 8. The logical connections depicted in FIG. 8 may include a local area network (LAN) 851 and a wide area network (WAN) 852. Such networking environments are commonplace in offices, enterprise-wide computer networks, Intranets and the Internet.

When employed in a LAN networking environment, the computer 820 can be connected to the local network 851 through a network interface or adapter 853. When utilized in a WAN networking environment, the computer 820 generally can include a modem 854, and/or is connected to a communications server on the LAN, and/or has other means for establishing communications over the wide area network 852, such as the Internet. The modem 854, which can be internal or external, can be connected to the system bus 823 via the serial port interface 846. In a networked environment, program modules depicted relative to the computer 820, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 828, and CD-ROM 831) to thereby reconfigure or otherwise alter the computer system's operation, as well as other processing of signals. The memory locations wherein such data bits are maintained are physical locations that have particular electrical, magnetic, or optical properties corresponding to the data bits.

Figure 9:
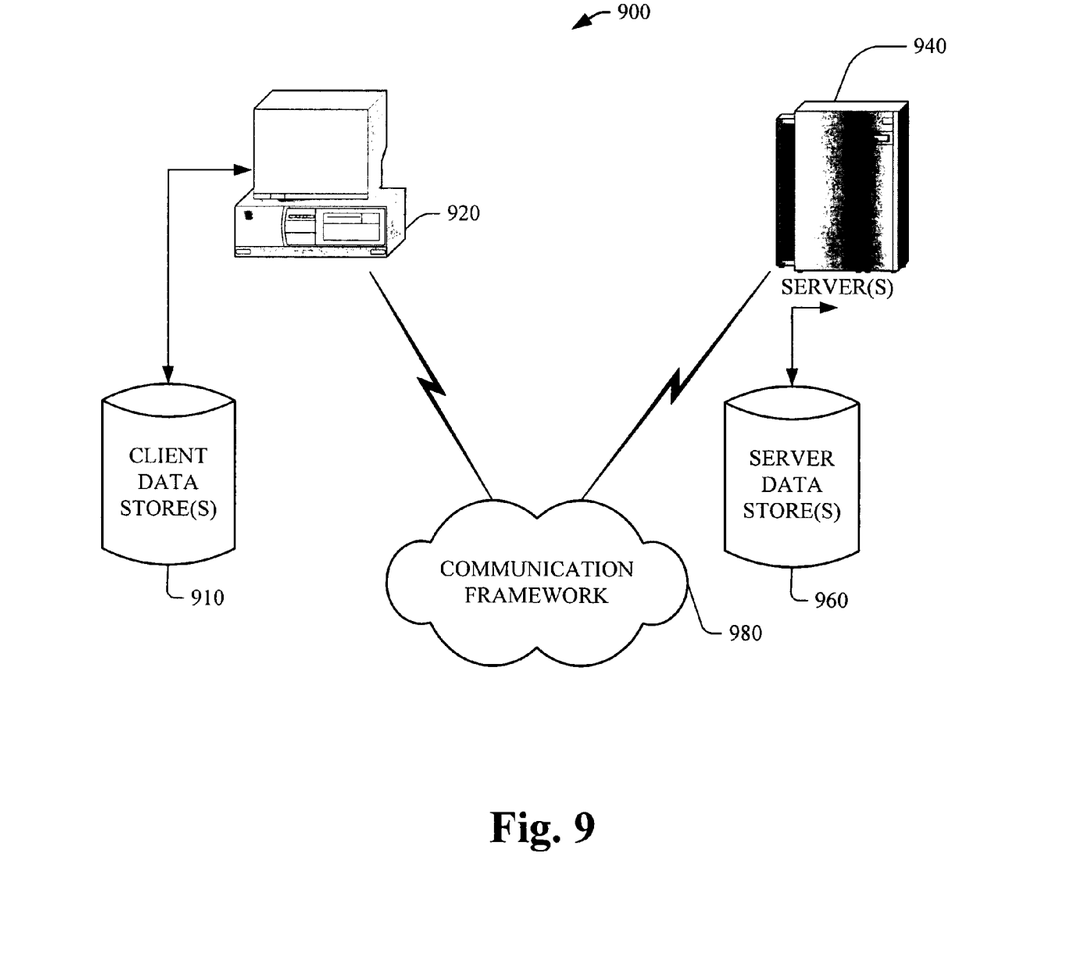
FIG. 9 illustrates a client—server system that can employ an IFRS according to one aspect of the present invention.

Referring now to FIG. 9, a client—server system 900 that can employ an IFRS according to one aspect of the present invention is illustrated. The client(s) 920 can be hardware and/or software (e.g., threads, processes, computing devices). The system 900 also includes one or more server(s) 940. The server(s) 940 can also be hardware and/or software (e.g., threads, processes, computing devices). For example, such servers 940 can house threads to perform transformations by employing the present invention. The client 920 and the server 940 can communicate, in the form of data packets transmitted according to the present invention, between two or more computer processes. As illustrated, the system 900 includes a communication framework 980 that can facilitate communications between the client(s) 920 and the server(s) 940. The client(s) 920 is operationally connected to one or more client data store(s) 910 that can store information local to the client(s) 920. Moreover, client 920 can access and update databases 960 located on a server computer 940 running a server process. In one aspect of the present invention, the communication frame work 980 can be the internet, with the client process being a Web browser and the server process being a Web server. As such, a typical client 920 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 940 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates a remote debugging operation comprising:
   at least one tester machine located behind a first firewall;
   at least one developer machine located behind a second firewall;
   an Internet Friendly Relay Service (IFRS) that implements a seamless connection over Hyper Text Transfer Protocol (HTTP) between the at least one tester machine and the at one least developer machine, to facilitate a scalable debugging procedure there between,
   wherein:
   the IFRS is positioned in a common reach area;
   the IFRS caches commands and answers to be exchanged between the at least one tester machine and the at least one developer machine;
   the at least one tester machine and the at least one developer machine poll the IFRS to access the commands and answers.

2. The system of claim 1, wherein the IFRS comprises at least one web server and at least one state server that receive commands and provide responses to the at least one tester machine and the at least one developer machine in response to polling by the at least one tester machine and the at least one developer machine.

3. The system of claim 2, wherein:
   the at least one tester machine comprises a plurality of tester machines; and
   the IFRS facilitates formation of an adaptive poll on the at least one web server by employing a Poisson statistical distribution for determining times for each of the plurality of tester machines to poll the IFRS.

4. The system of claim 1, the IFRS includes an Internet Information Services (IIS) web server.

5. The system of claim 1, the IFRS includes an IFRS manager that tracks an authorization for a client connected thereto.

6. The system of claim 5, the IFRS manager tracks an identity of a machine of the at least one tester machine and the at least one developer machine connected to the IFRS.

7. The system of claim 1, the IFRS includes an artificial intelligence component to regulate or balance a load level.

8. The system of claim 7, wherein the IFRS balances load level by at least one of a commence, pause, resume and halt of data exchange.

9. The system of claim 1, further comprising an intelligent proxy to aggregate communication with the IFRS.

10. A method of debugging a machine comprising:
   operating a tester machine to register with an Internet Friendly Relay Service (IFRS);
   operating a Developer machine to register with the IFRS;
   caching, with the IFRS, commands and answers to be exchanged between the at least one tester machine and the at least one developer machine; and
   polling the IFRS by the Tester machine and Developer machine such that the Tester machine and Developer machine are seamlessly connected for communication through a plurality of firewalls using Hyper Text Transfer Protocol (HTTP).

11. The method of claim 10, further comprising receiving a return ticket by the Tester from the IFRS.

12. The method of claim 10 further comprising notifying the Developer via e-mail upon registering the Tester with the IFRS.

13. The method of claim 10 further comprising obtaining debugging parameters by the Developer.

14. The method of claim 10 further comprising launching a debugger tool on a machine to be debugged.

15. The method of claim 10 further comprising employing an artificial intelligence scheme to regulate a load on the IFRS.

16. The method of claim 15 further comprising employing a classifier that is at least one of implicitly trained and explicitly trained.

17. The method of claim 15, regulating the load act comprises at least one of commencing, pausing, resuming and halting of data exchange.

18. The method of claim 10 further comprising tracking an authorization for a client connected to the IFRS.

19. The method of claim 10 further comprising adapting a polling on the IFRS via a mathematical algorithm.

20. A system that facilitates a remote debugging operation comprising:
   intercepting means for seamlessly connecting a plurality of client machines with a Developer machine over Hyper Text Transfer Protocol (HTTP), the client machines being located behind at least a first firewall and the Developer machine being located behind a second firewall, the means for intercepting caching commands and answers to be exchanged between the at least one tester machine and the at least one developer machine; and
   means for regulating a load on the intercepting means, the means for regulating load indicating times at which one or more of the plurality of client machines and the Developer machine poll the intercepting means.

* * * * *